US012655510B2

(12) United States Patent
Bae

(10) Patent No.: US 12,655,510 B2
(45) Date of Patent: Jun. 16, 2026

(54) WELDED MEMBER INCLUDING WELDED PORTION WITH EXCELLENT ELECTRODEPOSITION COATING CORROSION RESISTANCE

(71) Applicant: POSCO CO., LTD, Pohang-si (KR)

(72) Inventor: Gyu-Yeol Bae, Incheon (KR)

(73) Assignee: POSCO CO., LTD, Pohang-si (KR)

( * ) Notice: Subject to any disclaimer, the term of this patent is extended or adjusted under 35 U.S.C. 154(b) by 0 days.

(21) Appl. No.: 18/844,160

(22) PCT Filed: Dec. 18, 2023

(86) PCT No.: PCT/KR2023/020906
§ 371 (c)(1),
(2) Date: Sep. 5, 2024

(87) PCT Pub. No.: WO2024/177252
PCT Pub. Date: Aug. 29, 2024

(65) Prior Publication Data
US 2025/0188584 A1      Jun. 12, 2025

(30) Foreign Application Priority Data

Feb. 21, 2023   (KR) ........................ 10-2023-0022589
Feb. 22, 2023   (KR) ........................ 10-2023-0023875

(51) Int. Cl.
*B23K 35/30*          (2006.01)
*B32B 15/01*          (2006.01)
(Continued)

(52) U.S. Cl.
CPC ............ *C22C 38/58* (2013.01); *B32B 15/011* (2013.01); *C22C 38/004* (2013.01); *C22C 38/02* (2013.01);
(Continued)

(58) Field of Classification Search
None
See application file for complete search history.

(56) References Cited

U.S. PATENT DOCUMENTS

2008/0011721 A1    1/2008  Park
2014/0116578 A1    5/2014  Zhang et al.
(Continued)

FOREIGN PATENT DOCUMENTS

CN        108103393 A      6/2018
EP          3608432 A1      2/2020
(Continued)

OTHER PUBLICATIONS

Korean Office Action dated Oct. 24, 2024 issued in Korean Patent Application No. 10-2024-7017926 (with English translation).
(Continued)

*Primary Examiner* — Kim S. Horger
(74) *Attorney, Agent, or Firm* — Morgan Lewis & Bockius LLP

(57) ABSTRACT
Provided is a welded member including a welded portion with excellent electrodeposition coating properties and corrosion resistance. The present disclosure may provide a welding member including a gas shielded arc welded portion capable of securing excellent electrodeposition coating properties and corrosion resistance for a welded portion in the automobile industry.

11 Claims, 1 Drawing Sheet

(a)

(b)

(51) Int. Cl.

| | | |
|---|---|---|
| *C22C 38/00* | (2006.01) | |
| *C22C 38/02* | (2006.01) | |
| *C22C 38/06* | (2006.01) | |
| *C22C 38/38* | (2006.01) | |
| *C22C 38/42* | (2006.01) | |
| *C22C 38/44* | (2006.01) | |
| *C22C 38/48* | (2006.01) | |
| *C22C 38/50* | (2006.01) | |
| *C22C 38/54* | (2006.01) | |
| *C22C 38/58* | (2006.01) | |

(52) U.S. Cl.

CPC .............. *C22C 38/06* (2013.01); *C22C 38/38* (2013.01); *C22C 38/42* (2013.01); *C22C 38/44* (2013.01); *C22C 38/48* (2013.01); *C22C 38/50* (2013.01); *C22C 38/54* (2013.01)

(56) References Cited

U.S. PATENT DOCUMENTS

| | | | |
|---|---|---|---|
| 2017/0173743 A1* | 6/2017 | Ichimiya | ................. C22C 38/48 |
| 2019/0126409 A1 | 5/2019 | Seo et al. | |
| 2021/0086313 A1 | 3/2021 | Kodama et al. | |
| 2022/0154319 A1 | 5/2022 | Otsuka et al. | |
| 2022/0220595 A1 | 7/2022 | Otsuka et al. | |
| 2023/0264304 A1 | 8/2023 | Kinashi et al. | |

FOREIGN PATENT DOCUMENTS

| | | | | |
|---|---|---|---|---|
| EP | | 3950995 A1 | 2/2022 | |
| EP | | 4306253 A1 | 1/2024 | |
| JP | | 2000-141085 A | 5/2000 | |
| JP | | 2013-204103 A | 10/2013 | |
| JP | | 2019-081195 A | 5/2019 | |
| JP | | 2019-107697 A | 7/2019 | |
| JP | | 2019-118274 A | 7/2019 | |
| JP | | 2021-003717 A | 1/2021 | |
| JP | | 2021-003732 A | 1/2021 | |
| JP | | 2021-178354 A | 11/2021 | |
| JP | | 2022-042360 A | 3/2022 | |
| KR | | 10-1997-0058833 A | 8/1997 | |
| KR | | 10-2008-0006675 A | 1/2008 | |
| KR | | 10-2014-0026600 A | 3/2014 | |
| KR | | 10-2020-0133391 A | 11/2020 | |
| KR | | 10-2021-0107596 A | 9/2021 | |
| KR | | 10-2021-0133279 A | 11/2021 | |
| KR | | 10-2021-0135284 A | 11/2021 | |
| KR | | 10-2382359 B1 | 4/2022 | |
| WO | | 2009/082162 A2 | 7/2009 | |
| WO | | WO-2011145740 A1 * | 11/2011 | .............. B23K 9/18 |
| WO | | 2021/090519 A1 | 5/2021 | |
| WO | | 2022/230903 A1 | 11/2022 | |

OTHER PUBLICATIONS

Korean Decision to Grant dated Apr. 22, 2025 issued in Korean Patent Application No. 10-2024-7017926 (with English translation).

Office Action dated Jun. 3, 2025, issued in corresponding Japanese Patent Application No. 2024-555993.

Notice of Allowance dated Apr. 22, 2025, issued in corresponding Korean Patent Application No. 10-2024-7017926.

International Search Report and Written Opinion dated Mar. 18, 2024 issued in International Patent Application No. PCT/KR2023/020906 (with English translation).

Extended European Search Report dated Oct. 7, 2025 issued in European Patent Application No. 23924358.7.

* cited by examiner (a)	(b)

(a)	(b)

(a)	(b)

1

WELDED MEMBER INCLUDING WELDED PORTION WITH EXCELLENT ELECTRODEPOSITION COATING CORROSION RESISTANCE

CROSS-REFERENCE OF RELATED APPLICATIONS

This application is the U.S. National Phase under 35 U.S.C. § 371 of International Patent Application No. PCT/KR2023/020906, filed on Dec. 18, 2023, which in turn claims the benefit of Korean Application Nos. 10-2023-0022589, filed on Feb. 21, 2023 and 10-2023-0023875, filed on Feb. 22, 2023, the disclosures of which applications are incorporated by reference herein.

TECHNICAL FIELD

The present disclosure relates to a welded member including a welded portion with excellent electrodeposition coating corrosion resistance, and more particularly, to a gas shielded arc welded portion capable of securing excellent corrosion resistance and economic efficiency, which are essential when manufacturing parts.

BACKGROUND ART

In the automobile field, research on technology to reduce the weight of vehicle bodies and parts has emerged as a major issue due to fuel efficiency regulation policies in line with environmental protection, such as global warming issues. Chassis parts, which are important for automobile driving performance, also need to use high-strength steel materials to reduce weight in accordance with this trend.

In order to achieve such weight reduction in parts, it is essential to increase the strength of materials, and guaranteeing the durability of parts formed of high-strength steel in an environment in which a repetitive fatigue load is applied is an important factor.

However, in the case of arc welding, mainly used to secure strength when assembling automobile chassis parts, lap joints between parts are welded by welding wires, so it is inevitable to provide the joint a geometric shape. This may act as a repetitive fatigue stress concentration portion (a notch effect) to become a starting point of fracture, resulting in a decrease in the durability of the parts and having the limitation of losing the advantage of applying high-strength steel.

Therefore, in order t to improve the fatigue characteristics of the welded portion, it is most important to reduce the angle (a toe angle) of a bead end, which is the main stress concentration portion, and in addition, controlling the material and stress of a toe portion is an important factor. In addition, as mentioned above, demand for rust prevention to prevent perforation corrosion has increased due to the thinning of materials based on the trend of high strength and weight reduction of parts, so the adoption of plated steel materials has increased. However, in particular, a welding metal of an arc welded portion does not have a plating layer, so the corrosion resistance after painting is inferior to a base material. Accordingly, in a harsh corrosive environment when driving a vehicle, welded portions of chassis parts formed of plated steel sheets may be corroded at an early stage and have low fatigue characteristics. Meanwhile, during gas-shielded arc welding of plated steel, a large number of pore defects in the form of pits and blowholes occur in a welding bead due to the occurrence of zinc and other vapors, which may lead to a decrease in the strength of the welded portion and deteriorate welding productivity. In addition, in the case of general uncoated steel, slag occurring in the welding bead during gas-shielded arc welding causes painting defects and reduces corrosion resistance after painting, thereby increasing costs due to post-treatment processes, such as pickling or brushing to remove slag after welding, when manufacturing parts.

Recently, the development of lightweight chassis parts for next-generation eco-friendly vehicles has been actively underway, and in particular, the development of welding technology that may improve the characteristics of welded portions, while ensuring economic feasibility, has become an important issue.

SUMMARY OF INVENTION

Technical Problem

An aspect of the present disclosure is to provide a gas-shielded arc welded member capable of securing excellent electrodeposition coating corrosion resistance for a welded portion in the automobile industry.

The problems of the present disclosure are not limited to the aforementioned matters. The additional problems of the present disclosure are described throughout the specification, and those skilled in the art will have no difficulty in understanding the additional problems of the present disclosure from the content described in the specification of the present disclosure.

Solution to Problem

According to an aspect of the present disclosure, a welded member including a welded portion with excellent electrodeposition coating corrosion resistance includes a base material and a welded portion, wherein the welded portion includes, in wt %, C: 0.001 to 0.30%, Si: 1.00% or less (excluding 0%), Mn: 0.50 to 3.00%, P: 0.030% or less (excluding 0%), S: 0.030% or less (excluding 0%), Cr: 1.50% or less (excluding 0%), Mo: 0.60% or less (excluding 0%), Al: less than 0.10% (excluding 0%), Ni: 0.40% or less (excluding 0%), Ti: less than 0.10% (excluding 0%), a balance of Fe and other inevitable impurities, and satisfies Relational expression 1 and Relational expression 2, wherein, in a normal welded portion, excluding starting and ending zones of a welding bead corresponding to a length of a smaller value among 25% or 15 mm of a total length of the welding bead, an Si content of slag distributed along the periphery portion of a welding bead is 10% or less in terms of the slag's own weight.

$$3.5 \leq [Si] \times 100/[Mn] \leq 34.0 \qquad \text{[Relational Expression 1]}$$

(in Relational Expression 1, [Si] and [Mn] represent the wt % content of each element in parentheses for the welded portion)

$$[Ti] + [Al] < 0.10 \qquad \text{[Relational Expression 2]}$$

(in Relational Expression 2, [Ti] and [Al] represent the wt % content of each element in parentheses for the welded portion.)

The welded portion may further include, in wt %, one or more of Nb: 0.10% or less, V: 0.10% or less, Zr: 0.10% or less, and B: 0.01% or less.

The welded portion may further include, in wt %, Cu: 0.50% or less.

A silicon-based oxide slag area ratio of the welded portion may be 1% or less of the slag formed in the welded portion.

Even if the welded portion is electrodeposited without being pickled, the welded portion may not have a corrosion mass loss after a 15-year cyclic corrosion test according to the GMW 14872 test method.

The base material may include, in wt %, C: 0.04 to 0.18%, Si: 2.0% or less (including 0%), Mn: 0.5 to 3.0%, Cr: 2.0% or less (including 0%), Mo: 2.0% or less (including 0%), Al: 0.01 to 0.10%, P: 0.05% or less (excluding 0%), S: 0.05% or less (excluding 0%), a balance of Fe, and other inevitable impurities.

The base material may further include, in wt %, one or more of Ti: 0.20% or less, Nb: 0.10% or less, and Cu: 0.10% or less.

The base material may have a thickness of 0.8 to 4.0 mm.

According to an aspect of the present disclosure, automotive parts include the above welded portion.

Advantageous Effects of Invention

According to the present disclosure described above, as a next-generation welding technology that secures performance/cost competitiveness in line with the era of popularization of electric vehicles, a gas-shielded arc welded portion with excellent electrodeposition coating corrosion resistance may be effectively provided.

The various and beneficial advantages and effects of the present disclosure are not limited to the aforementioned content and may be more easily understood through description of specific embodiments of the present disclosure.

BEST MODE FOR INVENTION

Figures 1, 2, 3:
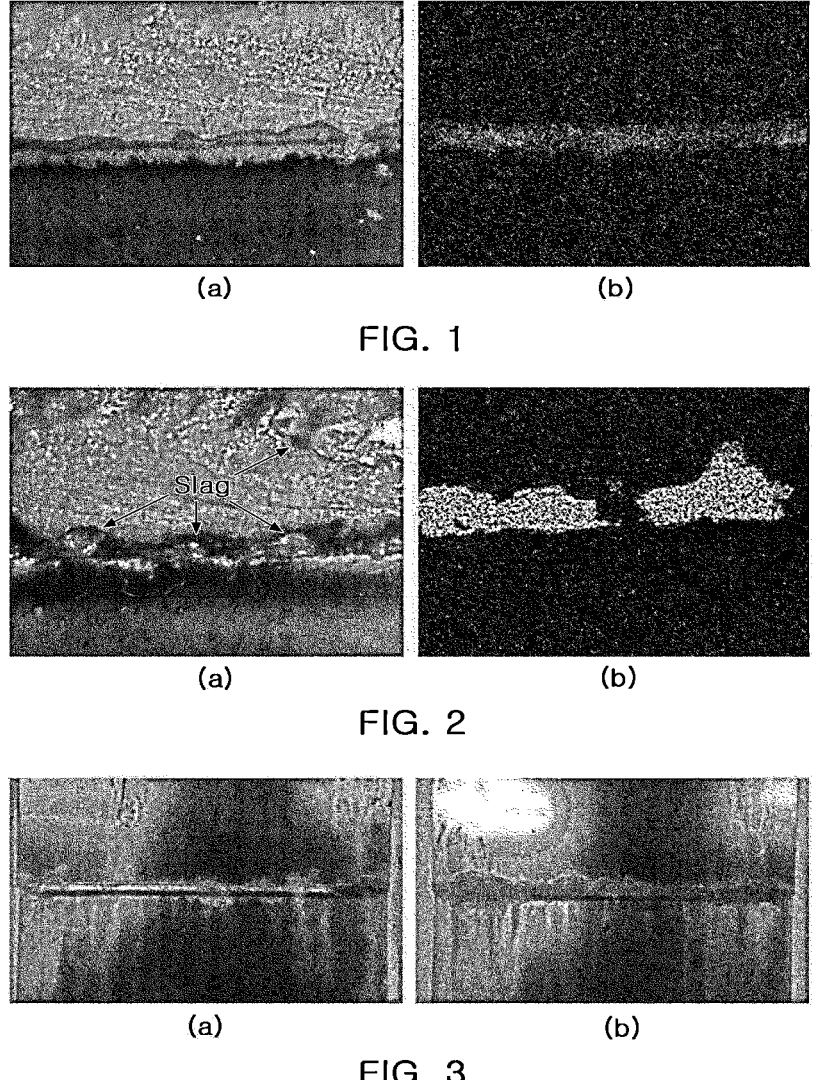
FIG. 1 (*a-b*) includes an enlarged photograph (a) of the appearance of a periphery portion of a welding bead of Inventive Example 2 in an embodiment of the present disclosure and an image (b) of an Si content distribution of slag distributed along the periphery portion of the welding bead analyzed through SEM EDS analysis.
FIG. 2(*a-b*) is an enlarged photograph (a) of the appearance of a periphery portion of a welding bead of Comparative Example 2 in an embodiment of the present disclosure and an image (b) of an Si content distribution of slag distributed along the periphery portion of the welding bead analyzed through SEM EDS analysis.
FIG. 3(*a-b*) is a photograph illustrating the appearance (a) of a welding bead after a corrosion test of Inventive Example 4 and the appearance (b) of a welding bead after a corrosion test of Comparative Example 4 in an embodiment of the present disclosure.

Hereinafter, the present disclosure is described.

In the present disclosure, the Si and Mn contents of a welded portion are controlled in order to ensure excellent electrodeposition coating properties and corrosion resistance of the welded portion. By controlling the Si and Mn contents, the fraction of silicon-based oxide slag, which deteriorates the electrodeposition coating properties of a welded portion, may be lowered, and in particular, the fraction of silicon-based oxide slag, which has a yellow-brown color and glass-like gloss at a periphery portion of a welding bead, may be lowered, thereby improving electrodeposition coating properties and corrosion resistance of the welded portion.

In addition, in the present disclosure, it is necessary to control the Ti and Al contents to secure the characteristics of reducing silicon-based oxide slag distributed along the periphery portion of the welding bead, which deteriorates the electrodeposition coating properties and corrosion resistance of the welded portion. Through the control of Ti and Al contents, the silicon-based oxide slag may be distributed evenly over the entire surface of the welded portion and has a band shape in a continuous or intermittent distribution along the periphery portion of the welding bead to be reduced, thereby improving the characteristics.

Meanwhile, in the present disclosure, the area fraction occupied by the silicon-based oxide slag of the welded portion may satisfy 1% or less (including 0%) with respect to the total length of the welded portion, and accordingly, the slag having a yellowish brown color and a glass-like gloss may not be distributed at the periphery portion of the welding bead.

Therefore, a welded member including a welded portion with excellent electrodeposition coating properties of the present disclosure includes: a base material; and a welded portion, wherein the welded portion includes, in wt %, C: 0.001 to 0.30%, Si: 1.00% or less (excluding 0%), Mn: 0.50 to 3.00%, P: 0.030% or less (excluding 0%), S: 0.030% or less (excluding 0%), Cr: 1.50% or less (excluding 0%), Mo: 0.60% or less (excluding 0%), Al: less than 0.10% (excluding 0%), Ni: 0.40% or less (excluding 0%), Ti: less than 0.10% (excluding 0%), a balance of Fe and other inevitable impurities, and satisfy Relational 1 Expression and Relational Expression 2, wherein, in a normal welded portion, excluding starting and ending zones of a welding bead corresponding to a length of a smaller value among 25% or 15 mm of a total length of the welding bead, an Si content of slag distributed along the periphery portion of a welding bead is 10% or less in terms of the slag's own weight.

Hereinafter, a welded member having a welded portion with excellent electrodeposition coating properties according to an embodiment of the present disclosure is described. First, in the welded portion forming the welded member of the present disclosure, the reason for adding each component and the reason for limiting the content are described in detail. It should be noted that the content of each component described below is based on wt % unless specifically mentioned.

C: 0.001~0.30%

Carbon (C) is a key element that may lower the temperature at which acicular ferrite, bainite, and martensite transformation begins through non-diffusion transformation as a welding metal is continuously cooled in a high-temperature austenite phase during a solidification process. If the C content is less than 0.001%, not only does the hardenability decrease, making it difficult to secure sufficient strength of the welding metal, but also a low-temperature transformation initiation temperature may not be sufficiently lowered according to the aforementioned principle, resulting in that an effect of offsetting tensile residual stress of the welded portion according to a low-temperature transformation expansion effect during a cooling process may be significantly lowered and a high-angle grain boundary structure with a large orientation angle difference between grains cannot be formed. Meanwhile, if the C content exceeds 0.30%, the viscosity of molten metal may be lowered, which not only results in a poor bead shape, but also excessively hardens the welding metal to lower toughness.

Si: 1.00% or Less (Excluding 0%)

Silicon (Si) is an element (deoxidizing element) promoting deoxidation of molten metal during arc welding, is advantageous in suppressing the occurrence of blowholes, and increases the low-temperature transformation initiation temperature. Meanwhile, if the Si content exceeds 1.00%, a large amount of non-conductive slag may occur, causing poor coating of the welded portion, and excessive deoxidation may cause insufficient surface activation of the welded portion, which may reduce penetrability of molten metal. Therefore, in the present disclosure, it is desirable to control the Si content to 1.00% or less. The Si content is more preferably 0.85% or less, even more preferably 0.75% or less, and most preferably 0.65% or less.

Mn: 0.5~3.0%

Manganese (Mn) is a deoxidizing element, is advantageous in suppressing the occurrence of blowholes by promoting deoxidation of molten metal during arc welding, and reduces the low-temperature transformation initiation temperature, like C. If the Mn content is less than 0.5%, there may be a disadvantage in that the deoxidation effect may be insufficient and blowholes may easily occur. Meanwhile, if the Mn content exceeds 3.0%, the viscosity of molten metal may be excessively high, so the molten metal may not properly flow into the welded portion if a welding speed is fast, resulting in the formation of a humping bead, which may be prone to a poor bead shape. More preferably, the Mn content is limited to 2.50% or less.

Cr: 1.50% or Less (Excluding 0%)

Chromium (Cr) is a ferrite stabilizing element and is an element advantageous for lowering the low-temperature transformation initiation temperature and improving strength by securing the hardenability of the welding metal. If the Cr content exceeds 1.50%, the brittleness of the welding metal may increase unnecessarily in some cases, making it difficult to secure sufficient toughness. The Cr content is more preferably 1.40% or less, even more preferably 1.30% or less, and most preferably 1.20% or less.

Mo: 0.60% or Less (Excluding 0%)

Molybdenum (Mo) is a ferrite stabilizing element and is an element advantageous in securing hardenability to improve the strength of the welding metal. If the Mo content exceeds 0.60%, there may be a disadvantage in that the toughness of the welding metal deteriorates in some cases.

P: 0.030% or Less (Excluding 0%)

Phosphorus (P) is an element generally mixed as an inevitable impurity in steel and is also an element included as a normal impurity in solid wire for arc welding. If the P content exceeds 0.030%, there may be a disadvantage in that high-temperature cracking of the welding metal may become more noticeable.

S: 0.030% or Less (Excluding 0%)

Sulphur(S) is an element generally mixed as an inevitable impurity in steel and is also an element included as a normal impurity in solid wire for arc welding. If the S content exceeds 0.030%, the toughness of the welding metal may deteriorate in some cases, and the surface tension of the molten metal may be insufficient during welding, causing a melted portion to flow excessively due to gravity during high-speed downward welding (welding from top to bottom during vertical welding) to make the shape of the welding bead poor.

Al: Less than 0.10% (Excluding 0%)

Aluminum (Al) is a deoxidizing element and even a trace amount thereof may promote deoxidation of the molten metal during arc welding to improve the strength of the welding metal. To ensure the aforementioned effect, 0% is excluded as a lower limit of the Al content. If the Al content is 0.10% or more, the production of Al-based oxide may increase, which in some cases reduces the strength and toughness of the welding metal, and electrodeposition coating defects in the welded portion may be sensitive due to non-conductive oxides. More preferably, the Al content is limited to less than 0.07%.

Ti: Less than 0.10% (Excluding 0%)

Titanium (Ti) is a deoxidizing element and even a trace amount thereof may promote deoxidation of the molten metal during arc welding to improve the strength of the welding metal. in addition, Ti facilitates the development of acicular ferrite, which may improve the toughness of the welded portion. To ensure the aforementioned effect, 0% is excluded as a lower limit of Ti content. If the Ti content is 0.10% or more, the production of Ti-based oxide may increase, which may have the disadvantage of lowering the strength and toughness of the welding metal in some cases. More preferably, the Ti content is limited to less than 0.07%.

Ni: 0.40% or Less (Excluding 0%)

Nickel (Ni) is an element that may improve the strength and toughness of welding metal. To ensure the aforementioned effect, 0% is excluded as a lower limit of Ni content. However, if the Ni content exceeds 0.40%, there may be a disadvantage of becoming sensitive to cracking, so the Ni content is set to 0.40% or less. The Ni content is more preferably 0.30% or less, even more preferably 0.20% or less, and most preferably 0.10% or less.

Although not particularly limited, according to an embodiment of the present disclosure, the welded member may selectively include one or more of Nb: 0.10% or less, V: 0.10% or less, Zr: 0.10% or less, and B: 0.01% or less.

Nb: 0.10% or Less

Niobium (Nb) is an element that may improve the strength and toughness of the welding metal by increasing hardenability and making a microstructure dense. In addition, Nb has the effect of improving the flow of molten metal and stabilizing an arc during arc welding. However, if the Nb content exceeds 0.10%, there may be a disadvantage in that a compound having low-melting point may be formed at grain boundaries, making high-temperature cracks more likely to occur.

V: 0.10% or Less

Vanadium (V) is an element that may improve the strength and toughness of the welding metal by increasing hardenability and making the microstructure dense. Vanadium is also a precipitation strengthening element that may improve the strength of welding metal by generating carbonitride. However, if the V content exceeds 0.10%, there may be a disadvantage in that the toughness of the welding metal may be lowered in some cases due to excessive strength resulted from excessive precipitates. Therefore, the V content is set to be 0.10% or less.

Zr: 0.10% or Less

Zirconium (Zr) is an element (deoxidizing element) that promotes deoxidation of molten metal during arc welding and is an element advantageous in suppressing the occurrence of blowholes. However, if the Zr content exceeds 0.10%, there may be a disadvantage in that the electrodeposition coating properties of the welded portion may deteriorate. Therefore, the Zr content is set to 0.10% or less.

B: 0.01% or Less

Boron (B) is an element that may improve the strength of the welding metal by increasing hardenability. However, f the content of B exceeds 0.01%, there may be a disadvantage in that the toughness of the welding metal may deteriorate in some cases due to excessive hardenability. Therefore, the B content is set to 0.01% or less.

In addition, although not particularly limited, according to an embodiment of the present disclosure, the welded member may selectively further include Cu: 0.50% or less in wt %.

Cu: 0.50% or Less

Copper (Cu) is an element effective in improving the strength of welding metal. However, if the Cu content exceeds 0.50%, there may be a disadvantage in that the cracking susceptibility of the welding metal may increase. The Cu content is more preferably 0.45% or less, even more preferably 0.40% or less, and most preferably 0.30% or less. Meanwhile, in order to sufficiently obtain the strength improvement effect, 0.01% or more of Cu may be included in the welding metal.

In addition, the balance of the present disclosure is iron (Fe). However, in the normal manufacturing process, unintended impurities from raw materials or the surrounding environment may be inevitably mixed, so this cannot be ruled out. Since the above impurities are known to anyone skilled in the art, the present disclosure does not specifically mention all thereof.

Relational Expression 1

In the present disclosure, the Si and Mn contents are controlled so that a value defined by Relational Expression 1 below satisfies 3.5 to 34.0 in order to secure excellent electrodeposition coating properties of the welded portion. By controlling the Si and Mn contents, the fraction of silicon-based oxide slag, which deteriorates the electrodeposition coating properties of the welded portion, may be lowered, and in particular, by lowering the fraction of silicon-based oxide slag having a yellowish brown color and having glass-like gloss at the periphery portion of the welding bead, the electrodeposition coating properties and corrosion resistance of the welded portion may be effectively improved. If the value defined by Relational Expression 1 below is less than 3.5, porosity defects may occur in the welded portion due to insufficient deoxidation of the welded portion. Conversely, if the value exceeds 34.0, the fraction of silicon-based oxide slag in the welded portion may increase, thereby sharply reducing the electrodeposition coating properties and corrosion resistance of the welded portion.

More preferably, the Si and Mn contents are controlled so that the value defined by Relational Expression 1 below satisfies 8.6 to 34.0.

$$3.5 \leq [Si] \times 100/[Mn] \leq 34.0 \qquad \text{[Relational Expression 1]}$$

(In Relational Expression 1 above, [Si] and [Mn] represent the wt % content of each element in parentheses for the welded portion)

Relational Expression 2

In addition, in the present disclosure, in order to ensure the characteristics of reducing silicon-based oxide slag distributed along the periphery portion of the welding bead, which deteriorates the electrodeposition coating properties and corrosion resistance of the welded portion, it is necessary to control the Ti and Al contents so that the value defined by Relational Expression 2 below is less than 0.10. Through the control of Ti and Al contents, the silicon-based oxide slag may be distributed evenly over the entire surface of the welded portion and has a band shape in a continuous or intermittent distribution along the periphery portion of the welding bead to be reduced, thereby improving the characteristics. If the value defined by Relational Expression 2 below is 0.10 or more, Ti and Al, which are strong deoxidizers that are prone to thermodynamically combine with oxygen at high temperatures in a cooling process during welding compared to Si, so Ti and Al may form oxides preferentially over Si to cover the surface and change surface tension of the molten metal, causing flow to occur from the center of the molten metal outwardly. In addition, because this may affect the slag distribution behavior on the surface of the molten metal, a problem may arise in which silicon-based oxide slag may be formed further along the periphery portion of the welding bead.

More preferably, the value defined by Relational Expression 2 below is controlled to less than 0.07.

$$[Ti] + [Al] < 0.10 \qquad \text{[Relational Expression 2]}$$

(In Relational Expression 2 above, [Ti] and [Al] represent the wt % content of each element in parentheses for the welded portion.)

In addition, in the present disclosure, in a normal welded portion, excluding starting and ending zones of a welding bead corresponding to a length of a smaller value among 25% or 15 mm of a total length of the welding bead formed in the welded portion constituting the welded member, an Si content of slag distributed along the periphery portion of a welding bead may be 10% or less in terms of the slag's own weight. That is, by controlling the aforementioned Si content to critical value or less, it was confirmed through research results of the present disclosure that the silicon-based oxide slag having a yellowish brown color and having glass-like gloss along the periphery portion of the welding bead, which deteriorate the electrodeposition coating properties and corrosion resistance of the welded portion, was distinctly reduced. At this time, if the Si content of the slag distributed along the periphery portion of the welding bead exceeds 10 wt % of the slag itself, the electrodeposition coating properties and corrosion resistance of the welded portion may deteriorate.

Meanwhile, in the present disclosure, the reason for excluding the starting and ending zones of the welding bead corresponding to the smaller length among 25% and 15 mm of the total length of the welding bead is that the section in which the arc usually starts or ends is outside a stable state of the arc, and thus, the section is actually excluded from an area of welding bead quality evaluation of the automobile manufacturers. At this time, if the total length of the welding bead is 60 mm or more, there is no particular problem although the arc instability area described above is reflected as a 15 mm-long area of the starting and ending zones of the welding bead. For example, if the total length of the welding bead is 100 mm, the start and end area of the welding bead is reflected as a 15 mm-long area corresponding to the smaller length among 15 mm and 25 mm which is 25% of the total length of the welding bead. If the total length of the welding bead is 30 mm or less, the starting and ending zones of the welding bead is reflected as a 7.5 mm-long area, which is the smaller length among 7.5 mm, which is 25% of the total length of the welding bead, and 15 mm.

In addition, in the present disclosure, the welded portion may satisfy that an area fraction occupied by slag of the welded portion is 1% or less (including 0%) with respect to the total length of the welded portion, and accordingly, slag having a yellowish brown color and glass-like gloss may not be distributed at the periphery portion of the welding bead. Therefore, the present disclosure may effectively provide parts, such as automobile parts, having a welded portion with excellent electrodeposition coating corrosion resistance even without a pickling treatment.

Meanwhile, in the present disclosure, there is no particular limitation on an alloy composition of the base material. However, as an example, the base material may include C: 0.04 to 0.18%, Si: 2.0% or less (including 0%), Mn: 0.5 to 3.0%, Cr: 2.0% or less (including 0%), Mo: 2.0% or less (including 0%), Al: 0.01 to 0.10%, P: 0.05% or less (excluding 0%), S: 0.05% or less (excluding 0%), a balance of Fe, and other inevitable impurities. In addition, the base material may selectively further include one or more of Ti: 0.20% or less (including 0%), Nb: 0.10% or less (including 0%), and Cu: 0.10% or less (including 0%). In addition, the base material may have a thickness of 0.8 to 4.0 mm.

In addition, the present disclosure is not limited to a specific composition of a welding wire forming the welded portion. For example, a solid wire for welding including, in wt %, C: 0.001 to 0.30%, Si: 0.25% or less (excluding 0%), Mn: 0.50 to 3.00%, P: 0.030% or less (excluding 0%), S: 0.030% or less (excluding 0%), Cr: 1.50% or less (excluding 0%), Mo: 0.60% or less (excluding 0%), Al: less than 0.10% (excluding 0%), Ni: 0.40% or less (excluding 0%), Cu: 0.50% or less (excluding 0%), Ti: less than 0.10% (excluding 0%), a balance of Fe, and other inevitable impurities may be used. Also, selectively, the wire composition may further include one or more of Nb: 0.10% or less, V: 0.10% or less, and Zr: 0.10% or less or may further include B: 0.01% or less.

Meanwhile, in the present disclosure, the type of shielding gas used for welding the base material is not particularly limited, and 100% $CO_2$ gas, Ar+20 $CO_2$ gas, Ar+10% $CO_2$ gas, Ar+5% $CO_2$ gas, and Ar+2% $O_2$ gas, or the like may be used as a shielding gas, but in particular, when Ar+5 to 20% $CO_2$ is used as the shielding gas, the present disclosure may exhibit remarkable effects. That is, in order to secure the tensile strength of the welded portion without rupture of the welded metal or fusion line in the present disclosure, it is preferable to mix 5 to 20% of $CO_2$ with Ar as a protective gas during welding.

MODE FOR THE INVENTION

Hereinafter, the present disclosure is described in more detail through examples. However, it should be noted that the following examples are only for illustrating and embodying the present disclosure and are not intended to limit the scope of the present disclosure. This is because the scope of the present disclosure is determined by matters stated in the patent claims and matters reasonably inferred therefrom.

EXAMPLE

Six types of hot-rolled pickling steel sheet base materials having a thickness of 2.0 mm, a length of 200 mm, a width of 150 mm, and a tensile strength of 380 MPa (steel 1), 540 MPa (steel 2), 670 MPa (steel 3), 780 MPa (steel 4), and 980 MPa (steel 5)) and 1050 MPa (steel 6), each having an alloy composition as shown in Table 1 below, by two sheets for each, were prepared. Also, seven types of solid wires for gas shielded arc welding having the composition shown in Table 2 below were prepared.

Next, the steel sheets were overlap-welded using each of the solid wires for welding. At this time, Pulse DC (shielding gas Ar+20% $CO_2$) was used as a welding method, the shielding gas flow rate was 20l/min, an angle of a welding torch was 45° with respect to a vertical direction of the base material, a wire protrusion length was 15 mm, and a welding current/voltage/speed conditions were 200 A-20V-80 cm/min. In addition, a gap between the lap joints was set to 0 mm, and a length of the lap joint was set to 10 mm.

Meanwhile, welding was started at a position 10 mm from a starting point in a longitudinal direction of the weld base material, welding was performed for a length of 180 mm, and welding was finished at a position of 10 mm from an ending point opposite to the welding start position.

TABLE 1

| BASE MATERIAL | ALLOY COMPOSITION (wt %) | | | | | | | | | | |
| No. | C | Si | Mn | P | S | Al | Cr | Mo | Ti | Nb | BALANCE |
| --- | --- | --- | --- | --- | --- | --- | --- | --- | --- | --- | --- |
| 1 | 0.05 | 0.02 | 0.30 | 0.008 | 0.003 | 0.035 | — | — | — | — | Fe |
| 2 | 0.07 | 0.06 | 0.80 | 0.010 | 0.002 | 0.035 | — | — | — | 0.04 | Fe |
| 3 | 0.08 | 0.04 | 1.20 | 0.007 | 0.004 | 0.030 | — | — | 0.06 | 0.05 | Fe |
| 4 | 0.07 | 0.30 | 1.75 | 0.009 | 0.005 | 0.030 | 0.30 | 0.10 | 0.10 | 0.02 | Fe |
| 5 | 0.09 | 0.90 | 2.00 | 0.009 | 0.001 | 0.025 | 0.20 | 0.20 | 0.08 | 0.02 | Fe |
| 6 | 0.07 | 1.10 | 2.10 | 0.009 | 0.001 | 0.025 | 0.90 | 0.01 | 0.07 | 0.03 | Fe |

TABLE 2

| WIRE | ALLOY COMPOSITION (wt %) | | | | | | | | | | |
| No. | C | Si | Mn | P | S | Cu | Ni | Ti | Cr | Mo | Al | B |
| --- | --- | --- | --- | --- | --- | --- | --- | --- | --- | --- | --- | --- |
| 1 | 0.07 | 0.07 | 1.73 | 0.012 | 0.006 | 0.18 | 0.02 | 0.001 | 0.043 | 0.007 | 0.008 | 0.003 |
| 2 | 0.09 | 0.86 | 1.46 | 0.015 | 0.010 | 0.18 | 0.02 | 0.002 | 0.040 | 0.003 | 0.001 | — |
| 3 | 0.08 | 0.09 | 1.70 | 0.009 | 0.005 | 0.15 | 0.01 | 0.035 | 1.400 | 0.530 | 0.020 | — |
| 4 | 0.07 | 0.37 | 1.65 | 0.011 | 0.006 | 0.25 | 3.00 | 0.040 | 0.500 | 0.300 | 0.006 | — |
| 5 | 0.07 | 0.07 | 1.70 | 0.014 | 0.006 | 0.17 | 0.01 | 0.002 | 1.440 | 0.510 | 0.001 | — |
| 6 | 0.07 | 0.08 | 1.75 | 0.013 | 0.004 | 0.20 | 0.03 | 0.320 | 0.050 | 0.010 | 0.150 | 0.003 |
| 7 | 0.09 | 0.85 | 1.48 | 0.012 | 0.008 | 0.19 | 0.04 | 0.250 | 0.030 | 0.008 | 0.120 | — |

The remaining components in Table 2 above are Fe and inevitable impurities.

For each welded portion formed by the above welding, a microstructure of a cross-sectional portion, perpendicular to the longitudinal direction at a longitudinal center of the welded portion was observed with an optical microscope to confirm a region of the welding metal in advance, and the region was cut into a fine chip. Next, with each chip sample, a chemical composition of the welded portion was measured through luminescence spectroscopy using high-frequency inductively coupled plasma (ICP), and is shown in Table 3 below.

In addition, in order to evaluate the corrosion resistance after electrodeposition coating of the welded portion, the specimens were classified according to whether a pickling treatment using a neutral pickling solution was applied, and a complex corrosion test was performed for 15 years in North America according to the GMW 14872 test method. The welded portion of each specimen was shot-blasted at a low pressure of about 0.5 bar to remove corrosion products from the welded portion. Next, a portion in which corrosion occurred most was observed with the naked eyes, a thickness reduction of the corresponding portion after the corrosion test, compared to a thickness of the raw material before the corrosion test, was measured to calculate corrosion mass loss in the welded portion from Relational Expression 3 below. The results are shown in Table 4 below.

$$\text{Corrosion mass loss (\%) of welded portion} = \quad \text{[Relational Expression 3]}$$

$$[(\text{material thickness after corrosion test} -$$

$$\text{material thickness before corrosion test})/$$

$$\text{material thickness before corrosion test}] \times 100$$

Meanwhile, the corrosion mass loss in a position in which the most corrosion occurred in each of the aforementioned specimens was indicated, and measurements were performed on a total of 5 specimens, respectively, and are shown in Table 4. (In particular, the maximum value of corrosion mass loss is underlined.)

In addition, in order to observe the bead appearance and inspect the slag fraction of the aforementioned welded portion, a picture is taken for the bead surface of a center portion having a length of 150 mm, excluding the starting and ending zones of 15 mm, in the welding bead of 180 mm to obtain images.

Then, the slag area was marked, the sum of the marked areas was calculated, and the slag area ratio was calculated from Relational Expression 4 below.

$$\text{Slag area ratio (\%)} = \quad \text{[Relational Expression 4]}$$

$$[\text{sum of slag area/total image area}] \times 100$$

When evaluating the slag occurrence situation shown in Table 4, a reference value of the silicon-based oxide slag area ratio was set to 1%, and cases of 1% or less were evaluated as ○ (pass) and the others were evaluated as X (fail). Meanwhile, a case in which silicon-based oxide slag, which is yellow-brown in color and has a glass-like gloss, is distributed at the periphery portion of the welding bead was evaluated as X (fail). This is a goal reference set to completely omit a slag removal post-treatment process of the welded portion, such as separate pickling or mechanical polishing brushing (both pickling and brushing are performed as necessary) performed after welding in order to improve the paint adhesion of the welded portion and the corrosion resistance after painting when manufacturing parts.

In addition, for a normal bead of a center portion having a length of 150 mm, excluding the portion of the starting and ending zones of 15 mm in the welding bead of 180 mm of each specimen, X-rays were irradiated to the slag having a thin band shape and continuously or intermittently distributed along the periphery portion of the bead using energy-dispersive X-ray fluorescence spectroscopy (EDS) to perform component analysis, and thereafter, a relative weight (wt %) of the Si component with respect to the total weight of the slag was measured, and a maximum value of the measurement value is shown as a value of Fs in Table 4 below.

TABLE 3

| WELDED MEMBER No. | BASE MATERIAL No. | WIRE No. | ALLOY COMPOSITION OF WELDED PORTION (wt %) | | | | | | | | | | | | | |
|---|---|---|---|---|---|---|---|---|---|---|---|---|---|---|---|---|
| | | | C | Si | Mn | P | S | Cu | Ni | Ti | Cr | Mo | Al | B | 식1 | 식2 |
| INVENTIVE EXAMPLE 1 | 1 | 1 | 0.06 | 0.04 | 1.15 | 0.010 | 0.005 | 0.09 | 0.010 | 0.001 | 0.02 | 0.004 | 0.022 | 0.002 | 3.5 | 0.02 |
| INVENTIVE EXAMPLE 2 | 2 | 1 | 0.07 | 0.07 | 1.27 | 0.011 | 0.004 | 0.07 | 0.011 | 0.001 | 0.03 | 0.003 | 0.021 | 0.002 | 5.5 | 0.02 |
| INVENTIVE EXAMPLE 3 | 3 | 1 | 0.08 | 0.06 | 1.47 | 0.010 | 0.005 | 0.08 | 0.009 | 0.031 | 0.01 | 0.002 | 0.019 | 0.003 | 4.1 | 0.05 |
| INVENTIVE EXAMPLE 4 | 4 | 1 | 0.07 | 0.19 | 1.74 | 0.011 | 0.006 | 0.10 | 0.017 | 0.051 | 0.15 | 0.051 | 0.020 | 0.004 | 10.9 | 0.07 |
| INVENTIVE EXAMPLE 5 | 5 | 1 | 0.08 | 0.49 | 1.87 | 0.010 | 0.004 | 0.09 | 0.010 | 0.041 | 0.12 | 0.104 | 0.017 | 0.002 | 26.2 | 0.06 |
| INVENTIVE EXAMPLE 6 | 6 | 1 | 0.07 | 0.59 | 1.92 | 0.011 | 0.004 | 0.10 | 0.010 | 0.036 | 0.47 | 0.009 | 0.016 | 0.001 | 30.7 | 0.05 |
| INVENTIVE EXAMPLE 7 | 5 | 3 | 0.09 | 0.50 | 1.85 | 0.009 | 0.003 | 0.08 | 0.005 | 0.058 | 0.80 | 0.365 | 0.023 | 0.001 | 27.0 | 0.08 |
| INVENTIVE EXAMPLE 8 | 6 | 3 | 0.08 | 0.65 | 1.91 | 0.009 | 0.003 | 0.08 | 0.005 | 0.060 | 1.15 | 0.265 | 0.028 | 0.002 | 34.0 | 0.09 |
| INVENTIVE EXAMPLE 9 | 6 | 5 | 0.07 | 0.59 | 1.90 | 0.012 | 0.004 | 0.09 | 0.005 | 0.036 | 1.17 | 0.260 | 0.013 | 0.001 | 31.1 | 0.05 |
| COMPARATIVE EXAMPLE 1 | 1 | 2 | 0.07 | 0.44 | 0.91 | 0.012 | 0.007 | 0.09 | 0.010 | 0.001 | 0.01 | 0.002 | 0.018 | 0.001 | 48.4 | 0.02 |
| COMPARATIVE EXAMPLE 2 | 2 | 2 | 0.08 | 0.46 | 1.13 | 0.013 | 0.006 | 0.08 | 0.009 | 0.001 | 0.02 | 0.003 | 0.018 | 0.001 | 40.7 | 0.02 |
| COMPARATIVE EXAMPLE 3 | 3 | 2 | 0.09 | 0.45 | 1.30 | 0.011 | 0.007 | 0.11 | 0.011 | 0.033 | 0.02 | 0.001 | 0.016 | 0.001 | 34.6 | 0.05 |
| COMPARATIVE EXAMPLE 4 | 4 | 2 | 0.08 | 0.58 | 1.61 | 0.012 | 0.008 | 0.10 | 0.015 | 0.054 | 0.17 | 0.053 | 0.017 | 0.002 | 36.0 | 0.07 |
| COMPARATIVE EXAMPLE 5 | 5 | 4 | 0.08 | 0.64 | 1.83 | 0.010 | 0.004 | 0.13 | 1.493 | 0.060 | 0.35 | 0.250 | 0.016 | 0.001 | 35.0 | 0.08 |
| COMPARATIVE EXAMPLE 6 | 6 | 4 | 0.07 | 0.74 | 1.88 | 0.010 | 0.004 | 0.13 | 1.486 | 0.060 | 0.70 | 0.005 | 0.016 | 0.001 | 39.4 | 0.08 |
| COMPARATIVE EXAMPLE 7 | 6 | 6 | 0.07 | 0.59 | 1.93 | 0.011 | 0.005 | 0.100 | 0.015 | 0.20 | 0.48 | 0.010 | 0.088 | 0.002 | 30.6 | 0.29 |
| COMPARATIVE EXAMPLE 8 | 6 | 7 | 0.08 | 0.98 | 1.79 | 0.010 | 0.005 | 0.009 | 0.020 | 0.16 | 0.47 | 0.009 | 0.073 | 0.001 | 54.7 | 0.23 |

[RELATIONAL EXPRESSION 1] [Si] × 100/[Mn], [RELATIONAL EXPRESSION 2] [Ti] + [Al]

The remaining components in Table 3 above are Fe and inevitable impurities.

TABLE 4

| | | | | ELECTRODEPOSITION COATING CORROSION RESISTANCE OF WELDED PORTION | | | | |
|---|---|---|---|---|---|---|---|---|
| WELDED MEMBER No. | BASE MATERIAL No. | WIRE No. | PICKLING TREATMENT | SLAG DISTRIBUTION BEFORE PICKLING TREATMENT | SLAG DISTRIBUTION AFTER PICKLING TREATMENT | Fs(%) | CORROSION MASS LOSS OF WELDED PORTION (%) | |
| INVENTIVE EXAMPLE 1 | 1 | 1 | OMITTED | ○ | — | 3.64 | NOT OCCUR | |
| INVENTIVE EXAMPLE 2 | 2 | 1 | OMITTED | ○ | — | 4.99 | NOT OCCUR | |
| INVENTIVE EXAMPLE 3 | 3 | 1 | OMITTED | ○ | — | 4.97 | NOT OCCUR | |
| INVENTIVE EXAMPLE 4 | 4 | 1 | OMITTED | ○ | — | 6.58 | NOT OCCUR | |
| INVENTIVE EXAMPLE 5 | 5 | 1 | OMITTED | ○ | — | 8.32 | NOT OCCUR | |
| INVENTIVE EXAMPLE 6 | 6 | 1 | OMITTED | ○ | — | 9.59 | NOT OCCUR | |
| INVENTIVE EXAMPLE 7 | 5 | 3 | OMITTED | ○ | — | 8.47 | NOT OCCUR | |
| INVENTIVE EXAMPLE 8 | 6 | 3 | OMITTED | ○ | — | 10.0 | NOT OCCUR | |
| INVENTIVE EXAMPLE 9 | 6 | 5 | OMITTED | ○ | — | 8.98 | NOT OCCUR | |
| COMPARATIVE EXAMPLE 1 | 1 | 2 | PERFORMED | X | X | 13.43 | 15.5  18.9  10.6  12.5 | 13.9 |
| COMPARATIVE EXAMPLE 2 | 2 | 2 | PERFORMED | X | X | 15.72 | 11.6  10.2  10.5  16.1 | 18.0 |

TABLE 4-continued

| | | | | | | | CORROSION MASS LOSS OF WELDED PORTION (%) | | | | |
|---|---|---|---|---|---|---|---|---|---|---|---|
| | | | | ELECTRODEPOSITION COATING CORROSION RESISTANCE OF WELDED PORTION | | | | | | | |
| WELDED MEMBER No. | BASE MATERIAL No. | WIRE No. | PICKLING TREATMENT | SLAG DISTRIBUTION BEFORE PICKLING TREATMENT | SLAG DISTRIBUTION AFTER PICKLING TREATMENT | Fs(%) | | | | | |
| COMPARATIVE EXAMPLE 3 | 3 | 2 | PERFORMED | X | X | 14.65 | 17.4 | 14.0 | 20.8 | 13.2 | 12.1 |
| COMPARATIVE EXAMPLE 4 | 4 | 2 | PERFORMED | X | X | 17.28 | 12.6 | 22.5 | 18.9 | 10.6 | 14.5 |
| COMPARATIVE EXAMPLE 5 | 5 | 4 | OMITTED | X | — | 20.37 | 16.0 | 15.0 | 20.4 | 15.8 | 19.2 |
| COMPARATIVE EXAMPLE 6 | 6 | 4 | OMITTED | X | — | 23.52 | 18.4 | 19.7 | 17.4 | 17.0 | 22.3 |
| COMPARATIVE EXAMPLE 7 | 6 | 6 | OMITTED | O | — | 11.84 | 10.1 | 9.52 | 7.39 | 10.4 | 9.76 |
| COMPARATIVE EXAMPLE 8 | 6 | 7 | PERFORMED | X | X | 38.93 | 28.3 | 25.2 | 32.7 | 24.5 | 27.9 |

In Table 3 above, '-' indicates that there are no relevant matters. In addition, Fs (%) refers to the maximum wt % of Si content relative to the components of slag having a thin band and distributed continuously or intermittently along the periphery portion of the welding bead, detected through SEM ESD.

As shown in Tables 1 to 4 above, in the case of Invention Examples 1 to 9 satisfying the alloy composition of the welded portion and Relational Expressions 1 and 2, the silicon-based oxide slag area ratios before pickling treatment were all 1% or less, and the Fs values were also 10% or less, confirming that they have excellent electrodeposition coating properties.

Meanwhile, in the case of automobile parts, after welding and assembly, they are generally manufactured through degreasing, water washing, pickling (including pickling with strong acid, weak acid or neutral solution), surface adjustment, conversion coating (including phosphate treatment), water washing and electrodeposition coating. In particular, in order to improve the electrodeposition coating properties and corrosion resistance after electrodeposition coating of welded portions of parts, it is inevitable to introduce the aforementioned pickling treatment or mechanical polishing brushing. In addition, due to environmental issues, it may be difficult to pickle with a strong acid solution, so if pickling treatment is performed with a weakly acidic or neutral solution, it may not be easy to completely remove slag from the welded portion, and in particular, slag remains at the periphery portion of the welding bead, which a factor is reducing the electrodeposition coating corrosion resistance of the welded portion in most cases.

In the present disclosure, the welded member having excellent electrodeposition coating properties in which the amount of silicon-based oxide slag formed in the welded portion may be reduced by controlling the alloy composition of the welded portion as described above and there is no burden of aforementioned pickling treatment by controlling the Fs value below an appropriate value may be provided.

Meanwhile, it can be seen that, in the case of Comparative Examples 1 to 6, which deviated from Relational Expression 1, the area ratio of silicon-based oxide slag before pickling treatment exceeded 1%, and in particular, in Comparative Examples 1 to 4, a large amount of silicon-based oxide slag was present even after pickling treatment. As a result, the corrosion mass loss of the welding portion occurred. Meanwhile, Comparative Examples 7 and 8 are cases not satisfying Relational Expressions 2 and Relational Expressions 1-2, and in particular, Comparative Example 7 satisfies Relational Expression 1, so the silicon-based oxide slag area ratio before pickling treatment is 1% or less, but does not satisfy Relational Expression 2, so the Fs value exceeded 10% and corrosion mass loss occurred in the welded portion. At this time, since Ti and Al are strong deoxidizers prone to thermodynamically combine with oxygen at high temperatures in a cooling process during welding, compared to Si, they may form oxides preferentially over Si to cover the surface and change the surface tension of the molten metal to cause flow from the center of the molten metal outwardly. Because this may affect the slag distribution behavior on the surface of the molten metal, it was determined that silicon-based oxide slag was formed more along the periphery portion of the welding bead. In addition, Comparative Example 8 did not satisfy both Relational Expressions 1 and 2, so not only did the silicon-based oxide slag area ratio exceed 1% both before and after pickling treatment, but the Fs value also exceeded 10%. Therefore, it can be seen that corrosion mass loss occurred in the welded portion.

FIG. 1 (a-b) includes an enlarged photograph (a) of the appearance of a periphery portion of a welding bead of Inventive Example 2 in an embodiment of the present disclosure and an image (b) of an Si content distribution of slag distributed along the periphery portion of the welding bead analyzed through SEM EDS analysis.

Here, it can be seen that Si is more evenly dispersed and distributed on the surface of the welded portion (light colored region in FIG. 1(b)), and silicon-based oxide slag, which has a yellow-brown color and glass-like gloss, is not distributed at the periphery portion of the welding bead.

FIG. 2(a-b) is an enlarged photograph (a) of the appearance of a periphery portion of a welding bead of Comparative Example 2 in an embodiment of the present disclosure and an image (b) of an Si content distribution of slag distributed along the periphery portion of the welding bead analyzed through SEM EDS analysis.

Here, it can be seen that, on the surface of the welded portion, Si is more concentrated at the periphery portion of the welding bead (light colored region in FIG. 2(b)), and silicon-based oxide slag, which has a yellow-brown color and glass-like gloss, is distributed at the periphery portion of the welding bead.

FIG. 3(a-b) is a photograph illustrating the appearance (a) of a welding bead after a corrosion test of Inventive Example 4 and the appearance (b) of a welding bead after a corrosion test of Comparative Example 4 in an embodiment of the present disclosure.

Here, it can be seen that, in the case of Inventive Example, only a very slight amount of red rust occurred on the surface of the welding bead and red rust did not extend to the base material, whereas in the case of Comparative Example, red rust was very severe not only in the welding bead but also in the base material, indicating that severe corrosion occurred.

The invention claimed is:

1. A welded member including a welded portion with excellent electrodeposition coating corrosion resistance comprises a base material; and a welded portion, wherein the welded portion comprises, in wt %, C: 0.001 to 0.30%, Si: 1.00% or less (excluding 0%), Mn: 0.50 to 3.00%, P: 0.030% or less (excluding 0%), S: 0.030% or less (excluding 0%), Cr: 1.50% or less (excluding 0%), Mo: 0.60% or less (excluding 0%), Al: less than 0.07% (excluding 0%), Ni: 0.40% or less (excluding 0%), Ti: less than 0.07% (excluding 0%), a balance of Fe and inevitable impurities, and satisfies Relational expression 1 and Relational expression 2, wherein, in a normal welded portion, excluding starting and ending zones of a welding bead corresponding to a length of a smaller value among 25% or 15 mm of a total length of the welding bead, an Si content of slag distributed along the periphery portion of a welding bead is 10% or less in terms of the slag's own weight, $$3.5 \leq [Si] \times 100/[Mn] \leq 34.0 \qquad \text{[Relational Expression 1]}$$

where [Si] and [Mn] represent the wt % content of each element in parentheses for the welded portion, $$[Ti] + [Al] \leq 0.07 \qquad \text{[Relational Expression 2]}$$

where [Ti] and [Al] represent the wt % content of each element in parentheses for the welded portion.

2. The welded member of claim 1, wherein the welded portion further comprises, in wt %, one or more of Nb: 0.10% or less, V: 0.10% or less, Zr: 0.10% or less, and B: 0.01% or less.

3. The welded member of claim 1, wherein the welded portion further comprises, in wt %, Cu: 0.50% or less.

4. The welded member of claim 1, wherein, a silicon-based oxide slag area ratio of the welded portion is 1% or less of the slag formed in the welded portion.

5. The welded member of claim 1, wherein, even if the welded portion is electrodeposited without being pickled, the welded portion does not have corrosion loss after a 15-year cyclic corrosion test according to the GMW 14872 test method.

6. The welded member of claim 1, wherein the base material comprises, in wt %, C: 0.04 to 0.18%, Si: 2.0% or less (including 0%), Mn: 0.5 to 3.0%, Cr: 2.0% or less (including 0%), Mo: 2.0% or less (including 0%), Al: 0.01 to 0.10%, P: 0.05% or less (excluding 0%), S: 0.05% or less (excluding 0%), a balance of Fe, and inevitable impurities.

7. The welded member of claim 6, wherein the base material further comprises, in wt %, one or more of Ti: 0.20% or less, Nb: 0.10% or less, and Cu: 0.10% or less.

8. The welded member of claim 1, wherein the base material has a thickness of 0.8 to 4.0 mm.

9. Automotive parts comprising the welded portion of claim 1.

10. The welded member of claim 1, wherein the welded portion satisfies Relational expression 2:

$$[Ti] + [Al] \leq 0.05. \qquad \text{[Relational Expression 2]}$$

11. The welded member of claim 1, wherein the welded portion satisfies Relational expression 2:

$$[Ti] + [Al] \leq 0.02. \qquad \text{[Relational Expression 2]}$$

\* \* \* \* \*